United States Patent
Furuta et al.

(10) Patent No.: US 9,987,698 B2
(45) Date of Patent: Jun. 5, 2018

(54) WIRE ELECTRIC DISCHARGE MACHINE HAVING SHAFT FEED CONTROL SYSTEM DISCRIMINATING FUNCTION

(71) Applicant: FANUC CORPORATION, Minamitsuru-gun, Yamanashi (JP)

(72) Inventors: Tomoyuki Furuta, Yamanashi (JP); Akiyoshi Kawahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1141 days.

(21) Appl. No.: 14/031,648

(22) Filed: Sep. 19, 2013

(65) Prior Publication Data

US 2014/0076856 A1  Mar. 20, 2014

(30) Foreign Application Priority Data

Sep. 20, 2012  (JP) ................ 2012-207475

(51) Int. Cl.
| | |
|---|---|
| B23H 7/02 | (2006.01) |
| B23H 7/04 | (2006.01) |
| B23H 1/02 | (2006.01) |
| B23H 7/06 | (2006.01) |
| B23H 7/20 | (2006.01) |
| G05B 19/4093 | (2006.01) |

(52) U.S. Cl.
CPC ............ B23H 1/02 (2013.01); B23H 7/065 (2013.01); B23H 7/20 (2013.01); G05B 19/40937 (2013.01); G05B 2219/45043 (2013.01)

(58) Field of Classification Search
CPC ... B23H 1/00; B23H 7/00; B23H 7/02; B23H 7/04; B23H 7/06; B23H 7/065; B23H 7/14; B23H 7/18; B23H 7/20; B23H 7/26
USPC ..... 219/68, 69.1, 69.11, 69.12, 69.13, 69.15, 219/69.16, 69.17, 69.18, 69.2
See application file for complete search history.

(56) References Cited

U.S. PATENT DOCUMENTS

| | | | | |
|---|---|---|---|---|
| 4,292,491 | A | * 9/1981 | Tanaka ................. | B23H 7/065 219/69.12 |
| 5,267,141 | A | * 11/1993 | Morita .................. | B23H 7/20 219/69.13 |
| 5,573,681 | A | * 11/1996 | Ishibashi .............. | B23H 7/065 219/69.12 |

(Continued)

FOREIGN PATENT DOCUMENTS

| | | |
|---|---|---|
| CN | 102078990 A | 6/2011 |
| EP | 0139763 A1 | 8/1985 |

(Continued)

OTHER PUBLICATIONS

Office Action dated Jul. 15, 2014, corresponding to Japanese patent application No. 2012-207475.

(Continued)

*Primary Examiner* — Michael Laflame, Jr.
(74) *Attorney, Agent, or Firm* — Hauptman Ham, LLP (57) ABSTRACT

When machining of a workpiece is started in a wire electric discharge machine, before a voltage is applied between a wire electrode and the workpiece (a machining gap), practicable shaft feed control systems are discriminated on the basis of machining conditions set in advance. According to the discrimination, running into an inability state of continuity of machining and an accuracy failure after machining are prevented beforehand.

10 Claims, 2 Drawing Sheets

(56) References Cited

U.S. PATENT DOCUMENTS

| | | | | |
|---|---|---|---|---|
| 5,660,579 | A * | 8/1997 | Nakayama | B24D 18/00 125/11.01 |
| 6,610,956 | B1 * | 8/2003 | Yasuda | B23H 1/02 219/69.12 |
| 6,721,621 | B1 * | 4/2004 | Naka | B23H 7/04 219/69.11 |
| 6,897,398 | B2 * | 5/2005 | Ogata | B23H 7/20 219/69.12 |
| 6,941,187 | B2 * | 9/2005 | Lu | B23H 1/02 219/69.16 |
| 2002/0128743 | A1 * | 9/2002 | Kurihara | B23H 7/04 700/162 |
| 2002/0190032 | A1 * | 12/2002 | Marchesi | B23H 7/20 219/69.13 |
| 2003/0093175 | A1 * | 5/2003 | Lu | B23H 1/02 700/162 |
| 2003/0098293 | A1 | 5/2003 | Sato et al. | |
| 2006/0091113 | A1 * | 5/2006 | Hiraga | B23H 7/04 219/69.12 |
| 2009/0240368 | A1 * | 9/2009 | Young, Jr. | B23K 31/10 700/166 |

FOREIGN PATENT DOCUMENTS

| | | |
|---|---|---|
| EP | 2327498 A2 | 6/2011 |
| JP | 63207513 A | 8/1988 |
| JP | 2298425 A | 12/1990 |
| JP | 516025 A | 1/1993 |
| JP | 8155744 A | 6/1996 |
| JP | 2571077 B2 | 1/1997 |
| JP | 2002254250 A | 9/2002 |
| JP | 2004283968 A | 10/2004 |
| JP | 2012045662 A | 3/2012 |

OTHER PUBLICATIONS

Partial European Search Report in EP Application No. 13182786.7, dated Apr. 24, 2017.

* cited by examiner

WIRE ELECTRIC DISCHARGE MACHINE HAVING SHAFT FEED CONTROL SYSTEM DISCRIMINATING FUNCTION

RELATED APPLICATIONS

The present application is, and claims priority from, Japanese Application Number 2012-207475, filed Sep. 20, 2012, the disclosure of which is hereby incorporated by reference herein in its entirety.

BACKGROUND OF THE INVENTION

1. Field of the Invention

The present invention relates to a wire electric discharge machine having a function of discriminating, before applying a voltage to a machining gap at the start of machining, a shaft feed control system that can be executed from machining conditions set in advance.

2. Description of the Related Art

As shaft feed control during machining by a wire electric discharge machine, in general, so-called voltage servo feed for performing shaft feed according to a measured machining-gap voltage or constant speed feed for always performing shaft feed at speed set under machining conditions is used. Shaft feed control for a wire electric discharge machine is performed according to a discharge pulse as disclosed in, for example, Japanese Patent Application Laid-Open No. 2002-254250. In this way, various systems are known concerning shaft feed control for a wire electric discharge machine.

In machining by a wire electric discharge machine, it is necessary to set, according to a wire diameter and a workpiece material, machining conditions for determining elements necessary for stable machining such as a shaft feed control system, a machining voltage, a machining frequency, wire feed speed, wire tension, and a machining liquid amount. The machining conditions are provided in a form of a machining condition table from a manufacturer of the wire electric discharge machine mainly according to a wire material, a wire diameter, a workpiece material, and a workpiece thickness. An operator determines machining conditions by selecting appropriate elements out of the machining condition table and inputting the elements to a numerical controller of the electric discharge machine or selecting the elements on the numerical controller.

However, when a workpiece to be machined is a workpiece made of a material and in thickness for which the manufacturer does not provide machining conditions, the operator needs to adjust machining conditions and machine the workpiece by himself/herself referring to machining conditions for a material and thickness provided from the manufacturer.

On the other hand, in general, a shaft feed control system during machining is determined according to manufacturer machining conditions for reference and the operator cannot select the shaft feed control system. However, in some cases, shaft feed control systems are set as one of machining conditions to allow the operator to select a dedicated shaft feed control system out of the set shaft feed control systems. Therefore, when the operator adjusts the machining conditions by himself/herself as explained above, the operator needs to select a presumably appropriate system out of a plurality of shaft feed control systems, perform test machining before executing actual machining using selected machining conditions including the selected (provisionally determined) shaft feed control system, and check whether machining can be stably performed to the end under the machining conditions.

If the machining conditions are determined in this way, a machining-gap voltage waveform is determined. If the machining-gap voltage waveform is determined, a shaft feed control system suitably for the machining-gap voltage waveform is determined. In machining conditions provided by a manufacturer of a wire electric discharge machine, shaft feed control systems matching the respective machining conditions are also set. Therefore, machining can be performed without a problem if the machining conditions provided by the manufacturer are used.

However, the manufacturer does not always provide machining conditions concerning all workpiece materials and all thicknesses. Therefore, in some cases, it is possible that a workpiece made of a material and in thickness for which the manufacturer does not provide machining conditions is machined.

In machining the workpiece made of a material and in thickness for which the manufacturer does not provide machining conditions, the operator sometimes adjusts machining conditions and machines the workpiece on the basis of machining conditions provided by the manufacturer. In such a case, a machining-gap voltage waveform is determined from the machining conditions adjusted by the operator. However, it is likely that the machining-gap voltage waveform and a shaft feed control system do not match.

When machining is performed in a state in which the machining-gap voltage waveform and the shaft feed control system do not match, for example, it is possible that a short circuit state occurs in many places of a machining course, electric discharge is once stopped, streak-like scratches are left on the workpiece, and, in the worst case, the short circuit state cannot be solved and the machining cannot be continued. When the operator changes the machining conditions, it is likely that the operator sets unintended machining conditions through wrong operation. In this case, it is also likely that the machining-gap voltage waveform and the shaft feed control system do not match. As a result, the machining failures explained above occur.

It often occurs that, depending on machining contents, a machining time is equal to or longer than ten hours or a workpiece itself is extremely expensive. A company undertaking machining suffers a significant loss if a machine and an operator are occupied for a long time for test machining or an expensive workpiece is consumed. If the test machining is not successful and, as a result, the test machining needs to be performed several times, the loss increases accordingly. In the case of additional machining for an existing component such as correction machining for a mold, since only one component is supplied, failure is not allowed.

Japanese Patent Application Laid-Open No. 63-207513 discloses a technique for appropriately changing or fixing machining speed and a target machining voltage value according to a machining condition and attaining stabilization of machining. However, this technique is a technique for changing the machining speed and the target machining voltage value during machining and is not a technique for determining a practicable shaft feed control system according to machining conditions set in advance before the machining.

SUMMARY OF THE INVENTION

Therefore, it is an object of the present invention to provide a wire electric discharge machine having a shaft feed control system discriminating function in which, when machining conditions provided by a manufacturer of the wire electric discharge machine are adjusted to perform machining, running into an inability state of continuity of machining and an accuracy failure after machining can be prevented beforehand by discriminating machinable shaft feed control before the start of the machining according to set machining conditions.

The present invention relates to a wire electric discharge machine having a shaft feed control system discriminating function. The wire electric discharge machine applies a voltage to a machining gap between a wire electrode and a workpiece arranged on a table to generate electric discharge and machines the workpiece while moving the wire electrode relatively to the table. The wire electric discharge machine includes: a shaft feed control unit capable of performing shaft feed in a plurality of shaft feed control systems; a machining condition input unit configured to input parameters for determining machining conditions; a shaft feed control system storing unit in which setting values of the parameters included in the machining conditions and practicable shaft feed control systems are stored in association with each other; and a shaft feed control system discriminating unit configured to discriminate the practicable shaft feed control systems according to the parameters input by the machining condition input unit and contents stored in the shaft feed control system storing unit.

The shaft feed control unit may be capable of performing shaft feed in two or more shaft feed control systems including at least one of speed control appropriate to voltage for performing shaft feed according to a machining-gap voltage, constant speed control for always performing shaft feed at constant speed, and constant speed control with speed reduction for reducing speed when the machining-gap voltage is lower than a voltage value set in advance and performing shaft feed at constant speed when the machining-gap voltage is higher than the voltage value set in advance.

The parameters of the machining conditions stored in the shaft feed control system storing unit can include any one of voltage setting for a machining power supply and frequency setting for a voltage cycle applied to the machining gap.

The parameters may be parameters set as numerical values in a predetermined range. Setting values of the parameters may be divided into a plurality of ranges. The shaft feed control system storing unit can store the divided setting values of the parameters and the practicable shaft feed control systems in association with each other.

The parameters may be parameters set as a plurality of values. The shaft feed control system storing unit can store each of the plurality of values of the parameters and the practicable shaft control system in association with each other.

The shaft feed control system storing unit can store a setting value of at least one parameter or a combination of setting values of a plurality of parameters included in the machining conditions, and the practicable shaft feed control systems in association with each other.

The machining conditions may include parameters for determining the shaft feed control system. When the shaft feed control system determined by the parameters of the machining conditions is included in the shaft feed control system storing unit, machining may be started using the shaft feed control system. On the other hand, when the shaft feed control system is not included in the shaft feed control system storing unit, shaft feed may not be performed.

The machining conditions may include parameters for determining the shaft feed control system. When the shaft feed control system determined by the parameters of the machining conditions is not included in the shaft feed control system storing unit, names of parameters that need to be changed in order to perform the shaft feed control system determined by the machining conditions may be displayed on a display device of a numerical controller.

All the shaft feed control systems may be prioritized in advance and the shaft feed control system with the highest priority may be selected out of all the discriminated shaft feed control systems to start machining.

The discriminated shaft feed control systems may be displayed on the display device of the numerical controller.

According to the present invention, it is possible to provide a wire electric discharge machine having a shaft feed control system discriminating function in which, when machining conditions provided by a manufacturer of the wire electric discharge machine are adjusted to perform machining, running into an inability state of continuity of machining and an accuracy failure after machining can be prevented beforehand by discriminating machinable shaft feed control before the start of the machining according to set machining conditions.

BRIEF DESCRIPTION OF THE DRAWINGS

The abovementioned objects and characteristics and other objects and characteristics of the present invention will be clarified from the following explanation of embodiments explained with reference to the accompanying drawings, wherein.

DESCRIPTION OF THE PREFERRED EMBODIMENTS

In order to prevent a machining failure due to mismatch of a machining-gap voltage waveform and a shaft feed control system, in the present invention, before a voltage is applied to a machining gap at the start of machining, practicable shaft feed control systems are discriminated from set machining conditions. For example, practicable shaft feed control systems are discriminated from machining conditions concerning voltage setting for a machining power supply and frequency setting for a voltage cycle applied to a machining gap among the machining conditions. The discriminated shaft feed control systems are displayed on a screen of a numerical controller to enable an operator to select an optimum shaft feed control system on the screen out of the displayed shaft feed control systems and then start machining. Alternatively, all shaft feed control systems are prioritized in advance to enable a wire electric discharge machine to automatically select a control system with the highest priority out of several control systems, with which shaft feed is possible, and start machining.

Consequently, it is possible to prevent, beforehand, machining from being started under machining conditions that should cause machining inability. Therefore, useless test machining is not performed. It is possible to reduce time occupied by the machine and the operator necessary for the test machining. Further, since workpieces to be wasted can be reduced, it is possible to reduce expenses necessary for the test machining.

Figure 1:
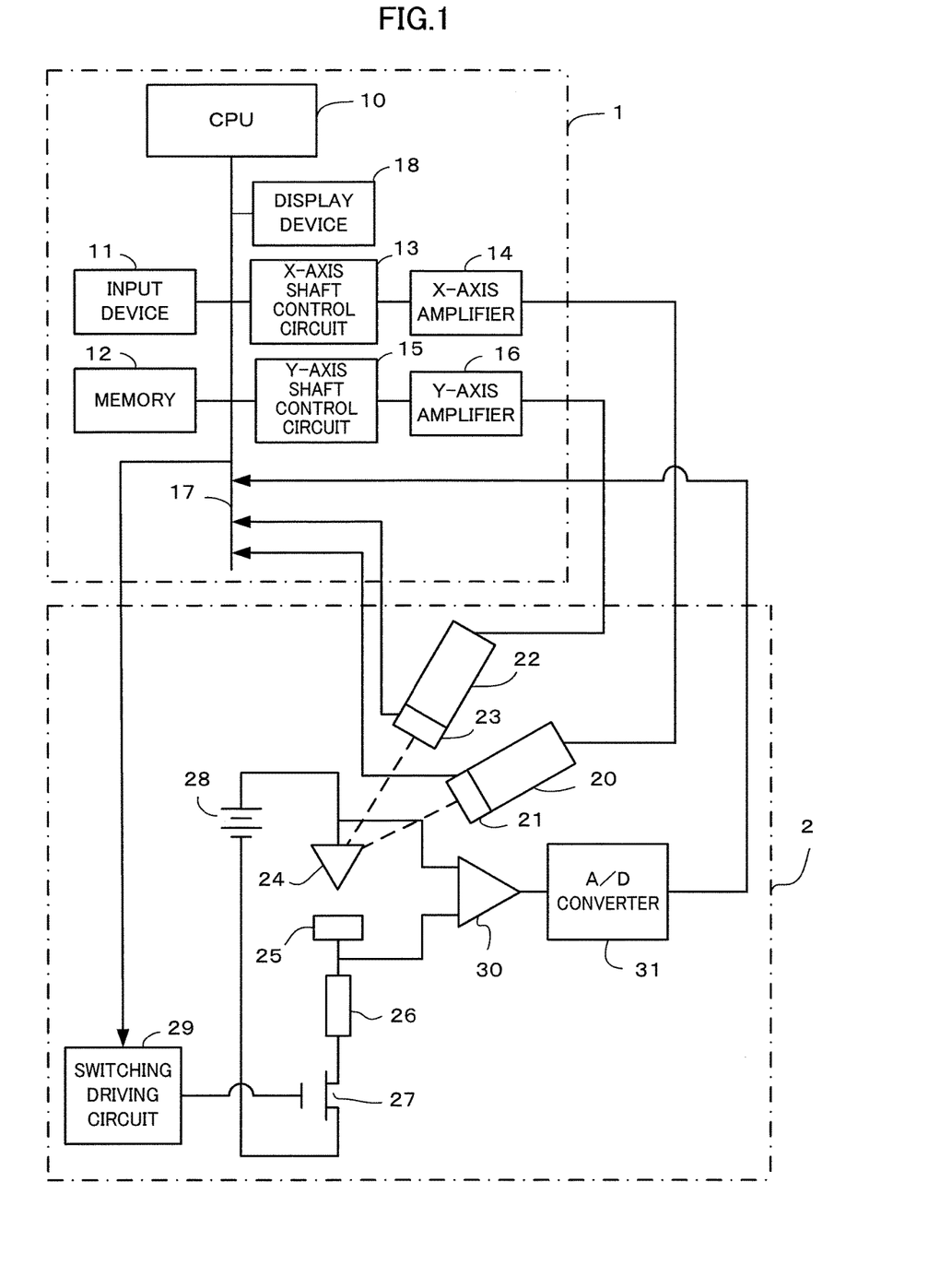
FIG. 1 is a main part configuration diagram of a wire electric discharge machine according to the present invention.

A wire electric discharge machine according to the present invention is explained with reference to FIG. 1.

The wire electric discharge machine includes a numerical controller 1 and a working machine 2. The numerical controller 1 controls the entire wire electric discharge machine.

The numerical controller 1 includes a processor (a CPU) 10, an input device 11, a memory 12, and a display device 18. These components 10 to 12 and 18 are connected to one another via a bus 17. The memory 12 includes a ROM and a RAM. The processor (the CPU) 10 controls the entire wire electric discharge machine using system software stored in the ROM.

The input device 11 includes a keyboard. Parameters of machining conditions can be manually input to the input device 11. An operator can input various parameters of machining conditions such as a target value of a machining voltage, a discharge period, a discharge current value, wire feeding speed, and a predetermined sampling period using the input device 11.

The parameters of the machining conditions include not only parameters included in a "machining condition table" generally attached to a wire electric discharge machine such as machining power supply voltage setting, machining frequency setting, wire feeding speed, a machining liquid amount, a workpiece material and thickness, and a wire material and a wire diameter but also all parameters, which can be set in advance, affecting at least one of a machining voltage, a machining current, machining speed, machining surface roughness, and machining accuracy such as parameters representing a temperature control method for machining liquid in a machining liquid tank ("constant temperature control" for controlling the temperature of the machining liquid to coincide with set temperature or "difference temperature control" for controlling the temperature of the machining liquid to be temperature offset from a measured ambient temperature by a setting value).

The processor (the CPU) 10 outputs, according to a machining program stored in the RAM of the memory 12, moving commands corresponding to machining conditions respectively to an X-axis shaft control circuit 13 and a Y-axis shaft control circuit 15. The X-axis shaft control circuit 13 outputs a driving command for driving an X-axis servo motor 20 to an X-axis servo amplifier 14. The Y-axis shaft control circuit 15 outputs a driving command for driving a Y-axis servo motor 22 to a Y-axis servo amplifier 16. The wire electric discharge machine shown in FIG. 1 can perform shaft feed in any one of a plurality of publicly-known shaft feed control systems according to a command of the processor (the CPU) 10.

The working machine 2 machines an object to be machined (workpiece 25) on the basis of machining conditions designated by the numerical controller 1. The working machine 2 includes the X-axis servo motor 20 and the Y-axis servo motor 22. The working machine 2 includes a direct-current power supply 28 configured to supply discharge energy to a machining gap between a wire electrode 24 and the workpiece 25, a current limiting resistor 26 configured to limit an electric current output from the direct-current power supply 28, a switching element 27, and a switching driving circuit 29 configured to ON/OFF-control the switching element 27. A circuit including the wire electrode 24, the workpiece 25, the current limiting resistor 26, the switching element 27, and the direct-current power supply 28 configures a power supply circuit for wire electric discharge machining for applying a pulse voltage and an electric current to the machining gap between the wire electrode 24 and the workpiece 25.

A detecting unit configured to detect a machining-gap voltage applied to a machining gap detects a machining-gap voltage between the wire electrode 24 and the workpiece 25. The machining-gap voltage is amplified by an amplifier 30, converted into a digital value at every predetermined period in an A/D converter 31, and output to the numerical controller 1.

The numerical controller 1 selects a shaft feed control system shown in Table 1 and controls driving of the working machine 2 in the selected shaft feed control system.

For example, as a system of speed control appropriate to voltage (for both rough machining and finish machining) Ma, the numerical controller 1 calculates an average machining-gap voltage value in the machining gap on the basis of the machining-gap voltage (the digital value) input to the numerical controller 1. The numerical controller 1 controls driving of the working machine 2 to machine the workpiece 25 at machining speed corresponding to the average machining-gap voltage in the machining gap. Alternatively, the numerical controller 1 controls driving of the working machine 2 to machine the workpiece 25 at machining speed corresponding to a voltage deviation, which is a difference between the average machining-gap voltage and a target voltage.

An X-axis encoder 21 is attached to the X-axis servo motor 20. A Y-axis encoder 23 is attached to the Y-axis servo motor 22. Actual machining speed is obtained by vector-summing amounts detected by the encoders 21 and 23.

The wire electrode 24 is tensed at predetermined tension by a set of wire guides (not shown) arranged at a predetermined interval. The wire electrode 24 is configured to be supplied at predetermined speed by a not-shown supplying device.

At least one of tables shown in Tables 2 to 9 explained below is stored in the memory 12 of the numerical controller 1. The tables 2 to 9 are referred to in a shaft feed control system discriminating unit in order to realize a shaft feed control system discriminating function in the wire electric discharge machine.

In the numerical controller 1 of the wire electric discharge machine, usually, data of the diameter of the wire electrode 24 used for machining of workpieces provided by a manufacturer of the wire electric discharge machine, data of the material of a workpiece to be machined, and data of workpiece thickness are captured as parameters. The data of the parameters may be used. Alternatively, the operator may input data of parameters to the numerical controller 1 from the input device 11.

Embodiments of the present invention are explained below.

First Embodiment

When machining is performed by the wire electric discharge machine according to a machining program, machining conditions are sent to the shaft feed control system discriminating unit from a machining condition input unit, which is the input device 11 such as a keyboard or the memory 12. The shaft feed control system discriminating unit compares parameters of the sent machining conditions and a correspondence relation stored in a shaft feed control system storing unit to automatically discriminate a practicable shaft feed control system corresponding to the parameters of the machining conditions.

The shaft feed control system discriminating unit and a shaft feed control unit are configured by system software stored in the ROM in the memory 12 and the processor (the CPU) 10 configured to execute the system software. The shaft feed control system storing unit is configured by the ROM in the memory 12.

Figure 2:
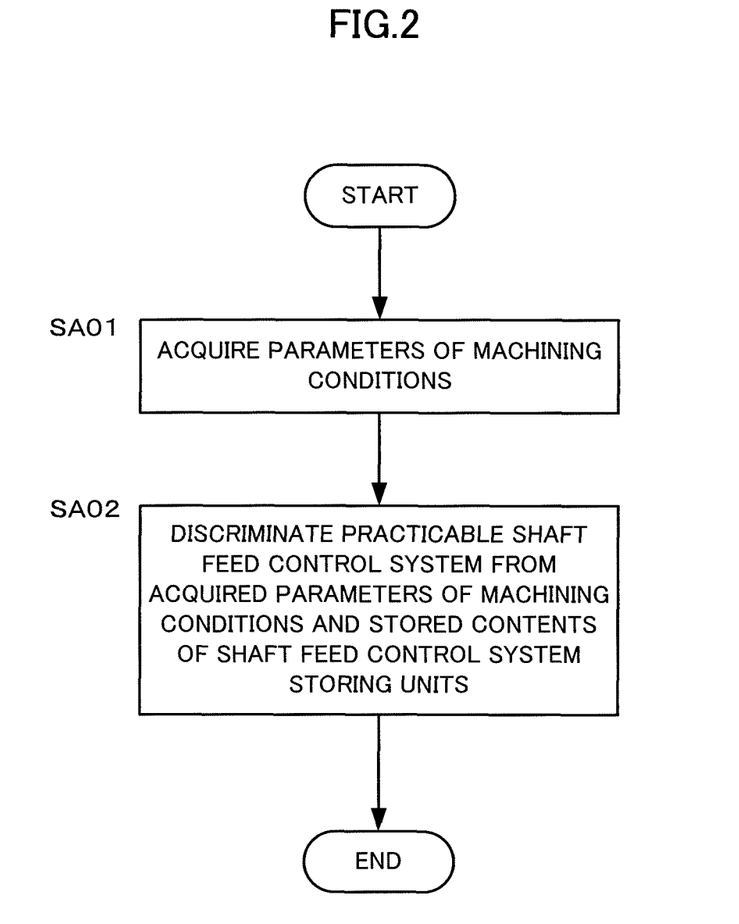
FIG. 2 is a flowchart for explaining processing for discriminating a practicable shaft feed control system according to the present invention.

FIG. 2 is a flowchart for explaining processing for discriminating a practicable shaft feed control system by the wire electric discharge machine according to the present invention.

The processing shown in FIG. 2 is executed in the processor (the CPU) 10 of the numerical controller 1. First, the processor (the CPU) 10 acquires parameters of machining conditions input by the operator or parameters of machining conditions stored in the memory 12 or the like (step SA01). The processor (the CPU) 10 discriminates a practicable shaft feed control system corresponding to the parameters of the machining conditions from the acquired parameters and contents stored in the shaft feed control system storing unit (step SA02).

Parameters of machining conditions are set by a method in which the operator manually inputs parameters using the keyboard (the input device 11) or a method of reading a file, in which setting values of parameters of machining conditions are recorded in advance, to a storage device in the numerical controller 1 or on the outside.

As explained above, the parameters of the machining conditions mean not only parameters included in a "machining condition table" generally attached to a wire electric discharge machine such as machining power supply voltage setting, machining frequency setting, wire feeding speed, a machining liquid amount, a workpiece material and thickness, and a wire material and a wire diameter but also parameters, which can be set in advance, affecting at least one of a machining voltage, a machining current, machining speed, machining surface roughness, and machining accuracy such as parameters representing a temperature control method for machining liquid in a machining liquid tank.

A correspondence relation between the parameters of the machining conditions and practicable shaft feed control methods corresponding to the parameters is stored in advance in the shaft feed control system storing unit formed in a memory area of the memory 12 (see Table 3).

Practicable shaft feed control systems in the first embodiment are shown in Table 1. As shown in Table 1, as the practicable shaft feed control systems, there are four control systems Ma, Mb, Mc, and Md. Contents of the respective control systems are as shown in Table 1.

TABLE 1

| SIGN REPRESENTING SHAFT FEED CONTROL SYSTEM | SHAFT FEED CONTROL SYSTEM |
|---|---|
| Ma | SPEED CONTROL APPROPRIATE TO VOLTAGE (FOR BOTH ROUGH MACHINING AND FINISH MACHINING) |
| Mb | SPEED CONTROL APPROPRIATE TO DISCHARGE PULSE (FOR ROUGH MACHINING) |
| Mc | SPEED CONTROL APPROPRIATE TO MACHINING-GAP STATE (FOR FINISH MACHINING) |
| Md | CONSTANT SPEED CONTROL (FOR BOTH ROUGH MACHINING AND FINISH MACHINING) |

Contents of the shaft feed control system storing unit are shown in Table 2 and Table 3.

In the first embodiment, as shown in Table 2, five kinds of parameters Pa, Pb, Pc, Pd, and Pe are included in a machining condition. Among the parameters, a settable range is divided into two or more in the parameters Pa, Pc, and Pd. That is, a settable range of the parameter Pa is divided into two setting ranges Pa1 and Pa2, a settable range of the parameter Pc is divided into three setting ranges Pc1, Pc2, and Pc3, and a settable range of the parameter Pd is divided into two setting ranges Pd1 and Pd2. The parameter Pe not having a settable range (having only values 0, 1, and 2 in an example shown in Table 2) is divided into three setting values (setting values Pe1, Pe2, and Pe3).

The parameters Pa to Pe shown in Table 2 include not only parameters (e.g., machining power supply voltage setting, machining frequency setting, wire feeding speed, a machining liquid amount, a workpiece material and thickness, and a wire material and a wire diameter) included in a "machining condition table" usually attached to the wire electric discharge machine but also parameters representing a temperature control method for machining liquid in a machining liquid tank. The parameters include parameters, which can be set in advance, affecting at least one of a machining voltage, a machining current, machining speed, machining surface roughness, and machining accuracy.

TABLE 2

| | MACHINING CONDITION | | | | |
|---|---|---|---|---|---|
| | PARAMETER Pa | PARAMETER Pb | PARAMETER Pc | PARAMETER Pd | PARAMETER Pe |
| SETTABLE RANGE | 0-100 | 0-200 | −100-100 | 0.0-100.0 | 0, 1, 2 |
| DIVIDED SETTABLE RANGES | SETTING RANGE Pa1 0-50 | SETTING RANGE Pb1 0-200 | SETTING RANGE Pc1 −100-−10 | SETTING RANGE Pd1 0.0-49.5 | SETTING VALUE Pe1 0 |
| | SETTING RANGE Pa2 51-100 | | SETTING RANGE Pc2 −9-50 | SETTING RANGE Pd2 49.6-100.0 | SETTING VALUE Pe2 1 |
| | | | SETTING RANGE Pc3 51-100 | | SETTING VALUE Pe3 2 |

Practicable shaft feed control systems corresponding to the types (the parameters Pa to Pe) of the parameters of the machining conditions and setting values (setting ranges divided in the types) of the parameters are stored in the shaft feed control system storing unit as shown in Table 3.

As explained above with reference to FIG. 2, the settable range of the parameter Pa is divided into the two setting ranges Pa1 and Pa2, the settable range of the parameter Pc is divided into the three setting ranges Pc1, Pc2, and Pc3, the settable range of the parameter Pd is divided into the two setting ranges Pd1 and Pd2, and the parameter Pe is divided into the three setting values Pe1, Pe2, and Pe3. Therefore, combinations of the parameter Pa, the parameter Pb, the parameter Pc, the parameter Pd, and the parameter Pe (combinations of the five kinds of parameters) are 2×1×3×2×3=36. The thirty-six combinations of the parameters Pa to Pe are a "setting range group" shown in Table 3. The practicable shaft feed control systems (see Table 1) are set for the respective thirty-six "setting range groups".

For example, if the parameter Pa is in the setting range Pa1, the parameter Pb is in the setting range Pb1, the parameter Pc is in the setting range Pc1, the parameter Pd is in the setting range Pd1, and the parameter Pe is in the setting range Pe1, a combination of the parameters is a "setting range group No. 1". Ma (speed control appropriate to voltage) and Md (constant speed control) are selected as practicable shaft feed systems corresponding to the combination of the parameters.

Consequently, it is possible to discriminate the practicable shaft feed control systems by sending the parameters of the machining conditions to the shaft feed control system discriminating unit before the start of machining.

Second Embodiment

In a second embodiment, shaft feed control systems practicable in a shaft feed control unit include one of three shaft feed control systems, i.e., speed control appropriate to voltage (for both rough machining and finish machining) Ma for performing shaft feed according to a machining-gap voltage, constant speed control (for both rough machining and finish machining) Md for always performing shaft feed at constant speed, and constant speed control with speed reduction for reducing speed when the machining-gap voltage is lower than a voltage value determined in advance and performing feeding at constant speed when the machining-gap voltage is higher than the voltage value determined in advance.

In the first embodiment, the speed control appropriate to voltage (for both rough machining and finish machining) Ma and the constant speed control (for both rough machining and finish machining) Md are set as the practicable shaft feed control systems.

Third Embodiment

In a third embodiment, as parameters of machining conditions used for discrimination in a shaft feed control system

TABLE 3

| SETTING RANGE GROUP NO. | MACHINING CONDITION | | | | | SHAFT FEED CONTROL SYSTEMS CORRESPONDING TO SETTING RANGE GROUP |
|---|---|---|---|---|---|---|
| | PARAMETER Pa | PARAMETER Pb | PARAMETER Pc | PARAMETER Pd | PARAMETER Pe | |
| 1 | Pa1 | Pb1 | Pc1 | Pd1 | Pe1 | Ma, Md |
| 2 | ↑ | ↑ | ↑ | ↑ | Pe2 | Ma, Md |
| 3 | ↑ | ↑ | ↑ | ↑ | Pe3 | Ma, Md |
| 4 | ↑ | ↑ | ↑ | Pd2 | Pe1 | Ma, Mb, Md |
| 5 | ↑ | ↑ | ↑ | ↑ | Pe2 | Ma, Mb, Md |
| 6 | ↑ | ↑ | ↑ | ↑ | Pe3 | Ma, Mb, Md |
| 7 | ↑ | ↑ | Pc2 | Pd1 | Pe1 | Ma, Mb, Md |
| 8 | ↑ | ↑ | ↑ | ↑ | Pe2 | Ma, Mb, Md |
| 9 | ↑ | ↑ | ↑ | ↑ | Pe3 | Ma, Mb, Md |
| 10 | ↑ | ↑ | ↑ | Pd2 | Pe1 | Ma, Mb, Md |
| 11 | ↑ | ↑ | ↑ | ↑ | Pe2 | Ma, Mb, Md |
| 12 | ↑ | ↑ | ↑ | ↑ | Pe3 | Ma, Mb, Md |
| 13 | ↑ | ↑ | Pc3 | Pd1 | Pe1 | Ma, Mb, Mc, Md |
| 14 | ↑ | ↑ | ↑ | ↑ | Pe2 | Ma, Mb, Mc, Md |
| 15 | ↑ | ↑ | ↑ | ↑ | Pe3 | Ma, Mb, Mc, Md |
| 16 | ↑ | ↑ | ↑ | Pd2 | Pe1 | Ma, Mb, Mc, Md |
| 17 | ↑ | ↑ | ↑ | ↑ | Pe2 | Ma, Mb, Mc, Md |
| 18 | ↑ | ↑ | ↑ | ↑ | Pe3 | Ma, Mb, Mc, Md |
| 19 | Pa2 | ↑ | Pc1 | Pd1 | Pe1 | Ma, Mb, Mc, Md |
| 20 | ↑ | ↑ | ↑ | ↑ | Pe2 | Ma, Mb, Mc, Md |
| 21 | ↑ | ↑ | ↑ | ↑ | Pe3 | Ma, Mb, Mc, Md |
| 22 | ↑ | ↑ | ↑ | Pd2 | Pe1 | Ma, Mb, Mc, Md |
| 23 | ↑ | ↑ | ↑ | ↑ | Pe2 | Ma, Mb, Mc, Md |
| 24 | ↑ | ↑ | ↑ | ↑ | Pe3 | Ma, Mb, Mc, Md |
| 25 | ↑ | ↑ | Pc2 | Pd1 | Pe1 | Ma, Mb, Mc, Md |
| 26 | ↑ | ↑ | ↑ | ↑ | Pe2 | Ma, Mb, Mc, Md |
| 27 | ↑ | ↑ | ↑ | ↑ | Pe3 | Ma, Mb, Mc, Md |
| 28 | ↑ | ↑ | ↑ | Pd2 | Pe1 | Ma, Mb, Mc, Md |
| 29 | ↑ | ↑ | ↑ | ↑ | Pe2 | Ma, Mb, Mc, Md |
| 30 | ↑ | ↑ | ↑ | ↑ | Pe3 | Ma, Mb, Mc, Md |
| 31 | ↑ | ↑ | Pc3 | Pd1 | Pe1 | Md |
| 32 | ↑ | ↑ | ↑ | ↑ | Pe2 | Md |
| 33 | ↑ | ↑ | ↑ | ↑ | Pe3 | Md |
| 34 | ↑ | ↑ | ↑ | Pd2 | Pe1 | — |
| 35 | ↑ | ↑ | ↑ | ↑ | Pe2 | — |
| 36 | ↑ | ↑ | ↑ | ↑ | Pe3 | — | discriminating unit, one or both of voltage setting for a machining power supply and frequency setting for a voltage cycle applied to a machining gap are used (see Tables 4 and 5). For example, in rough machining, when a voltage of the machining power supply is set high (to 20 volts or higher) and a frequency of the voltage cycle applied to the machining gap is set low (to 500 KHz or lower), as shown in Table 4, speed control appropriate to voltage (Ma), speed control appropriate to discharge pulse (Mb), or constant speed control (Md) is selected as a practicable shaft feed control system.

Fourth Embodiment

In a fourth embodiment, parameters of machining conditions, ranges of which are set by numerical values, are divided into a plurality of ranges and the divided ranges and practicable shaft feed control systems are stored in a shaft feed control system storing unit in association with each other (see Table 2).

Fifth Embodiment

In a fifth embodiment, parameters of machining conditions set by a plurality of values are stored in a shaft feed control system storing unit with setting values of the respective parameters and practicable shaft feed control systems associated with each other (see Table 3).

Sixth Embodiment

In a sixth embodiment, among the parameters of the machining conditions designated in the fourth or fifth embodiment, a setting value of at least one parameter or a combination of setting values of a plurality of parameters and practicable shaft feed control systems are stored in a shaft feed control system storing unit in association with each other.

As shown in Table 3 (the first embodiment), from the respective parameters Pa to Pe, ranges divided in the parameters or setting values are selected one each and combined to set one setting range group. In the example shown in Table 2, the ranges of the parameters Pa, Pc, and Pd are divided into two or three (the fourth embodiment) and three setting values are individually divided in the parameter Pe (the fifth embodiment). Therefore, when, from the respective parameters Pa to Pe, ranges divided in the parameters or setting values are selected one each and combined, as explained above, thirty-six combinations, i.e., the setting range groups Nos. 1 to No. 36 are set.

Practicable shaft feed control systems are allocated in advance to the respective thirty-six setting range groups out of the practicable shaft feed control systems (Ma, Mb, Mc, and Md).

In actual machining, practicable shaft feed control systems are sometimes limited depending on types and setting values of parameters of machining conditions. Therefore, the practicable shaft feed control systems are associated according to the types and the setting values of the parameters. The associated shaft feed control systems may be one (Md) as in the setting range groups No. 31 to 33 or may be a plurality of shaft feed control systems. No associated shaft feed control systems may be provided as in the setting range groups Nos. 34 to 36.

An example in the third embodiment is specifically explained in which voltage setting for a machining power supply and frequency setting for a voltage cycle applied to a machining gap are used as parameters of machining conditions used for discrimination in the shaft feed control discriminating unit.

Practicable shaft feed control systems are the following four shaft feed control systems as in the first embodiment:
Ma: Speed control appropriate to voltage (for both rough machining and finish machining);
Mb: Speed control appropriate to discharge pulse (for rough machining);
Mc: Speed control appropriate to machining-gap state (for finish machining); and
Md: Constant speed control (for both rough machining and finish machining).

The feed axis controls do not match depending on the magnitude of a voltage of a machining-gap voltage waveform and a voltage application frequency. That is, it is possible to discriminate whether a certain shaft feed control system is practicable or not according to voltage setting for a machining power supply and voltage application frequency setting specified by machining conditions.

The speed control appropriate to voltage (for both rough machining and finish machining) Ma is a system for rectifying a machining-gap voltage waveform to calculate an average voltage value and calculating shaft feeding speed from a reference voltage value and a gain determined by machining conditions. In this system, as a frequency setting value increases, a ratio of a transition region increases and accuracy of an average voltage value is deteriorated. Therefore, the speed control appropriate to voltage becomes unsuitable as a frequency increases.

The speed control appropriate to discharge pulse (for rough machining) Mb is a publicly-known system for calculating shaft feeding speed according to a counted number of discharge pulses (see, for example, Japanese Patent Application Laid-Open No. 2002-254250). In this system, discharge determination becomes difficult as a power supply voltage falls. Therefore, the speed control appropriate to discharge pulse for rough machining becomes unsuitable as the power supply voltage falls.

The speed control appropriate to machining-gap state (for finish machining) Mc is a publicly-known system for calculating shaft feeding speed according to the number of opening pulses of a high-frequency voltage (see, for example, Japanese Patent Application Laid-Open No. 2012-45662). In this system, opening determination becomes difficult as the power supply voltage falls. Therefore, the speed control appropriate to machining-gap state becomes unsuitable.

The constant speed control (for both rough machining and finish machining) Md is a system for always performing shaft feed at set speed.

As in the speed control appropriate to discharge pulse (for rough machining) Mb and the speed control appropriate to machining-gap state (for finish machining) Mc, practicable shaft feed control systems are limited depending on whether machining is rough machining or finish machining, according to circumstances. Therefore, it is possible to discriminate whether the shaft feed control is possible by comparing power supply voltage setting, voltage application frequency setting, and the number of times of machining respectively with thresholds set by an experiment in advance.

When a threshold of the power supply voltage setting is 20 volts and a threshold of the voltage application frequency is 500 kHz, practicable shaft feed control systems can be tabulated as shown in Table 4 (rough machining) and Table 5 (finish machining).

TABLE 4

| ROUGH MACHINING | | POWER SUPPLY VOLTAGE SETTING | |
|---|---|---|---|
| | | LOW (POWER SUPPLY VOLTAGE ≤20 [ V]) | HIGH (POWER SUPPLY VOLTAGE >20 [ V]) |
| VOLTAGE APPLICATION FREQUENCY SETTING | LOW (FREQUENCY SETTING ≤500 [kHz]) | VOLTAGE CONTROL CONSTANT SPEED CONTROL | VOLTAGE CONTROL DISCHARGE PULSE CONTROL CONSTANT SPEED CONTROL |
| | HIGH (FREQUENCY SETTING >500 [kHz]) | CONSTANT SPEED CONTROL | DISCHARGE PULSE CONTROL CONSTANT SPEED CONTROL |

TABLE 5

| FINISH MACHINING | | POWER SUPPLY VOLTAGE SETTING | |
|---|---|---|---|
| | | LOW (POWER SUPPLY VOLTAGE ≤20 [ V]) | HIGH (POWER SUPPLY VOLTAGE >20 [ V]) |
| VOLTAGE APPLICATION FREQUENCY SETTING | LOW (FREQUENCY SETTING ≤500 [kHz]) | VOLTAGE CONTROL CONSTANT SPEED CONTROL | VOLTAGE CONTROL STATE DISCRIMINATION CONTROL CONSTANT SPEED CONTROL |
| | HIGH (FREQUENCY SETTING >500 [kHz]) | CONSTANT SPEED CONTROL | STATE DISCRIMINATION CONTROL CONSTANT SPEED CONTROL |

The number of times of machining is added to the parameters (the parameter Pa is power supply voltage setting and the parameter Pb is voltage application frequency setting) shown in Tables 4 and 5 as the parameter Pc, a threshold of the number of times of machining is set to 1, and the parameters are tabulated as in the example of the shaft feed control system storing unit explained in the first embodiment (see Tables 2 and 3). Then, the parameters are tabulated as shown in Tables 6 and 7.

TABLE 6

| | MACHINING CONDITION | | |
|---|---|---|---|
| | PARAMETER Pa POWER SUPPLY VOLTAGE SETTING | PARAMETER Pb VOLTAGE APPLICATION FREQUENCY SETTING | PARAMETER Pc NUMBER OF TIMES OF MACHINING |
| SETTABLE RANGE | 0-200 [V] | 10-1000 [kHz] | 1-10 [TIMES] |
| DIVIDED SETTABLE RANGES | SETTING RANGE Pa1 0-20 SETTING RANGE Pa2 21-200 | SETTING RANGE Pb1 10-500 SETTING RANGE Pa2 501-1000 | SETTING RANGE Pc1 1 SETTING RANGE Pc2 2-10 |

TABLE 7

| SETTING RANGE GROUP NO. | MACHINING CONDITION | | | SHAFT FEED CONTROL SYSTEMS CORRESPONDING TO SETTING RANGE GROUP |
|---|---|---|---|---|
| | PARAMETER Pa POWER SUPPLY VOLTAGE SETTING | PARAMETER Pb VOLTAGE APPLICATION FREQUENCY SETTING | PARAMETER Pc NUMBER OF TIMES OF MACHINING | |
| 1 | Pa1 | Pb1 | Pc1 | Ma, Md |
| 2 | ↑ | ↑ | Pc2 | Ma, Md |
| 3 | ↑ | Pb2 | Pc1 | Md |
| 4 | ↑ | ↑ | Pc2 | Md |
| 5 | Pa2 | Pb1 | Pc1 | Ma, Mb, Md |

TABLE 7-continued

| SETTING RANGE GROUP NO. | MACHINING CONDITION | | | SHAFT FEED CONTROL SYSTEMS CORRESPONDING TO SETTING RANGE GROUP |
|---|---|---|---|---|
| | PARAMETER Pa POWER SUPPLY VOLTAGE SETTING | PARAMETER Pb VOLTAGE APPLICATION FREQUENCY SETTING | PARAMETER Pc NUMBER OF TIMES OF MACHINING | |
| 6 | ↑ | ↑ | Pc2 | Ma, Mc, Md |
| 7 | ↑ | Pb2 | Pc1 | Mb, Md |
| 8 | ↑ | ↑ | Pc2 | Mc, Md |

In this way, it is possible to discriminate, before the start of machining, practicable shaft feed control systems from machining conditions set in advance. Besides the four shaft feed control systems Ma to Md, for example, there are publicly-known control systems disclosed in Japanese Patent Application Laid-Open No. 2-298425 and Japanese Patent Application Laid-Open No. 2004-283968. Those control systems can be added to the selectable shaft feed control systems.

Seventh Embodiment

In a seventh embodiment, machining is started if, as a result of discrimination of a shaft feed control system, shaft feed is possible with a shaft feed control system determined by the present machining conditions. Shaft feed control is stopped if the present conditions disable execution of the shaft feed control. Consequently, it is possible to prevent in advance machining from being started under machining conditions that disable machining.

In an example shown in Table 8, among the parameter Pa (power supply voltage setting), the parameter Pb (voltage application frequency setting), the parameter Pc (the number of times of machining), and the parameter Pd (a shaft feed control system) of machining conditions, ranges of the parameters Pa, Pb, and Pc are divided into two and a range of the parameter Pd is not divided. When, from the respective parameters Pa to Pd, ranges divided in the parameters are selected one each and combined, 2×2×2×1=8 combinations, i.e., the setting range groups Nos. 1 to No. 8 are set. Practicable shaft feed control systems are allocated in advance to the respective eight setting range groups out of the practicable shaft feed control systems (Ma, Mb, Mc, and Md) shown in Table 1.

In the case of the setting range groups Nos. 1, 2, 5, and 6, since the speed control appropriate to voltage (for both rough machining and finish machining) Ma, which is the shaft feed control system designated in the machining conditions, is included in the practicable shaft feed control systems, machining is started. On the other hand, in the case of the setting range groups Nos. 3, 4, 7, and 8, since Ma is not included in the practicable shaft feed control system, the shaft feed control is stopped.

TABLE 8

| SETTING RANGE GROUP NO. | MACHINING CONDITION | | | | SHAFT FEED CONTROL SYSTEMS CORRESPONDING TO SETTING RANGE GROUP |
|---|---|---|---|---|---|
| | PARAMETER Pa POWER SUPPLY VOLTAGE SETTING | PARAMETER Pb VOLTAGE APPLICATION FREQUENCY SETTING | PARAMETER Pc NUMBER OF TIMES OF MACHINING | PARAMETER Pd SHAFT FEED CONTROL SYSTEM | |
| 1 | Pa1 | Pb1 | Pc1 | Ma | Ma, Md |
| 2 | ↑ | ↑ | Pc2 | Ma | Ma, Md |
| 3 | ↑ | Pb2 | Pc1 | Ma | Md |
| 4 | ↑ | ↑ | Pc2 | Ma | Md |
| 5 | Pa2 | Pb1 | Pc1 | Ma | Ma, Mb, Md |
| 6 | ↑ | ↑ | Pc2 | Ma | Ma, Mc, Md |
| 7 | ↑ | Pb2 | Pc1 | Ma | Mb, Md |
| 8 | ↑ | ↑ | Pc2 | Ma | Mc, Md |

Eighth Embodiment

Concerning a shaft feed control system determined from the present machining conditions, it is discriminated whether shaft feed control is practicable or not. If the shaft feed control is not practicable, the name of a parameter (the name of a parameter of any one of power supply voltage setting, voltage application frequency setting, and the number of times of machining) that needs to be changed is displayed on the screen of the display device 18 of the numerical controller 1 to urge an operator to change the parameter of the name.

In the example shown in Table 8, for example, when a machining condition is the setting range group No. 7, the shaft feed control system Ma designated under to machining condition is not included in the practicable shaft feed control systems. However, if the setting range of the parameter Pb is changed from Pb2 to Pb1, the setting range group is changed from No. 7 to No. 5. As a result, as shown in Table 8, machining can be performed in the shaft feed control system Ma in the setting range group. Therefore, in such a case, the operator is urged on the screen to reset the setting range from Pb2 to Pb1 concerning the parameter Pb.

Ninth Embodiment

The four shaft feed control systems Ma to Md are prioritized. A control system with the highest priority is set out of practicable shaft feed control systems to start machining. An example in which numerical values representing the priority are added to the shaft feed control systems is shown in Table 9. A smaller numerical value indicates higher priority.

In the example shown in Table 7, when a machining condition is the "setting range group No. 5", the shaft feed control systems Ma, Mb, and Md are selected as practicable shaft feed control systems. However, among the selected three shaft feed control systems Ma, Mb, and Md, according to Table 9, the shaft feed control system Mb has the highest priority. Therefore, the shaft feed control system Mb is automatically selected and machining is started in the shaft feed control system.

TABLE 9

| SIGN REPRESENTING SHAFT FEED CONTROL SYSTEM | SHAFT FEED CONTROL SYSTEM | PRIORITY |
|---|---|---|
| Ma | VOLTAGE CONTROL (FOR BOTH ROUGH MACHINING AND FINISH MACHINING) | 2 |
| Mb | DISCHARGE PULSE CONTROL (FOR ROUGH MACHINING) | 1 |
| Mc | STATE DISCRIMINATION CONTROL (FOR FINISH MACHINING) | 3 |
| Md | CONSTANT SPEED CONTROL (FOR BOTH ROUGH MACHINING AND FINISH MACHINING) | 4 |

Tenth Embodiment

Discriminated practicable shaft feed control systems are displayed on the display device 18 of the numerical controller 1. The practicable shaft feed control systems are displayed on the screen of the numerical controller to cause an operator to select a shaft feed control system out of the practicable shaft feed control systems. Consequently, it is possible to change the shaft feed control system to prevent, beforehand, machining that will cause machining inability.

What is claimed is:

1. A wire electric discharge machine that applies a voltage to a machining gap between a wire electrode and a workpiece arranged on a table to generate electric discharge and machines the workpiece while moving the wire electrode relatively to the table, the wire electric discharge machine comprising:
    a shaft feed control unit capable of performing shaft feed in a plurality of shaft feed control systems;
    a machining condition input unit configured to input parameters for determining machining conditions;
    a shaft feed control system storing unit in which setting values of the parameters included in the machining conditions and practicable shaft feed control systems are stored in association with each other; and
    a shaft feed control system discriminating unit configured to discriminate the practicable shaft feed control systems according to the parameters input by the machining condition input unit and contents stored in the shaft feed control system storing unit, wherein
    all the shaft feed control systems are prioritized in advance and the shaft feed control system with the highest priority is selected out of all the discriminated shaft feed control systems prior to machining the workpiece.

2. The wire electric discharge machine according to claim 1, wherein the shaft feed control unit is capable of performing shaft feed in two or more shaft feed control systems including at least one of:
    speed control appropriate to voltage for performing shaft feed according to a machining-gap voltage;
    constant speed control for always performing shaft feed at constant speed; and
    constant speed control with speed reduction for reducing speed when the machining-gap voltage is lower than a voltage value set in advance and performing shaft feed at constant speed when the machining-gap voltage is higher than the voltage value set in advance.

3. The wire electric discharge machine according to claim 1, wherein the parameters of the machining conditions stored in the shaft feed control system storing unit include any one of:
    voltage setting for a machining power supply; and
    frequency setting for a voltage cycle applied to the machining gap.

4. The wire electric discharge machine according to claim 1, wherein
    the parameters are parameters set as numerical values in a predetermined range, and setting values of the parameters are divided into a plurality of ranges, and
    the shaft feed control system storing unit stores the divided setting values of the parameters and the practicable shaft feed control systems in association with each other.

5. The wire electric discharge machine according to claim 1, wherein
    the parameters are parameters set as a plurality of values, and
    the shaft feed control system storing unit stores each of the plurality of values of the parameters and the practicable shaft control system in association with each other.

6. The wire electric discharge machine according to claim 1, wherein the shaft feed control system storing unit stores a setting value of at least one parameter or a combination of setting values of a plurality of parameters included in the machining conditions, and the practicable shaft feed control systems in association with each other.

7. The wire electric discharge machine according to claim 1, wherein
    the machining conditions include parameters for determining the shaft feed control system,
    when the shaft feed control system determined by the parameters of the machining conditions is included in the shaft feed control system storing unit, machining is started using the shaft feed control system, and when the shaft feed control system is not included in the shaft feed control system storing unit, shaft feed is not performed.

8. The wire electric discharge machine according to claim 1, wherein
    the machining conditions include parameters for determining the shaft feed control system, and
    when the shaft feed control system determined by the parameters of the machining conditions is not included in the shaft feed control system storing unit, names of parameters that need to be changed in order to perform the shaft feed control system determined by the machining conditions are displayed on a display device of a numerical controller.

9. The wire electric discharge machine according to claim 1, wherein the discriminated shaft feed control systems are displayed on a display device of a numerical controller.

10. The wire electric discharge machine of claim 2, wherein the plurality of shaft feed control systems is configured to perform:
- speed control for performing shaft feed according to a discharge pulse between the wire electrode and the workpiece;
- speed control for performing shaft feed according to a machining-gap state between the wire electrode and the workpiece.

* * * * *